United States Patent [19]

Brizio et al.

[11] Patent Number: 4,867,666
[45] Date of Patent: Sep. 19, 1989

[54] SYSTEM FOR THE RAPID CLAMPING OF DIES ON A HORIZONTAL PRESS FOR THE INJECTION MOULDING OF PLASTICS MATERIALS

[75] Inventors: Giuseppe Brizio, Fossano; Roberto Gallizio, Turin; Luigi Tosco, Santena, all of Italy

[73] Assignee: Fiat Auto S.p.A., Turin, Italy

[21] Appl. No.: 178,095

[22] Filed: Apr. 6, 1988

[30] Foreign Application Priority Data

Apr. 7, 1987 [IT] Italy ............................ 67287 A/87

[51] Int. Cl.⁴ ............................................ B29C 45/70
[52] U.S. Cl. .................................... 425/190; 425/589; 425/595
[58] Field of Search ............... 425/589, 595, 185, 190, 425/193, 195

[56] References Cited

U.S. PATENT DOCUMENTS 4,472,127 9/1984 Cyriax et al. ...................... 425/190

Primary Examiner—Jay H. Woo
Assistant Examiner—Timothy W. Heitbrink
Attorney, Agent, or Firm—Pennie & Edmonds

[57] ABSTRACT

A system for the rapid clamping of dies on a horizontal press for the injection moulding of plastics materials consists of a pair of structures fixed permanently along two opposite sides of the fixed and movable plates of the press and defining therewith two guides adapted slidably to receive the fixing flanges of the respective die. Motor-driven clamping means are associated with these guides and are operable simultaneously to clamp the fixing flanges of the die to the attachment structures.

6 Claims, 3 Drawing Sheets icture # SYSTEM FOR THE RAPID CLAMPING OF DIES ON A HORIZONTAL PRESS FOR THE INJECTION MOULDING OF PLASTICS MATERIALS

BACKGROUND OF THE INVENTION

1. Field of the Invention

A system for the rapid clamping of dies on a horizontal press for the injection moulding of plastics materials.

The present invention is applicable to horizontal presses for the injection moulding of plastics materials, of the type comprising a pair of facing vertical support plates which are displaceable horizontally relative to each other and are arranged for the removable fixing of respective dies provided with fixing flanges.

2. Description of the Prior Art

Conventionally, in horizontal presses of the above-specified type, the fixed and movable plates have a plurality of grooves intended to enable connection of the fixing flanges of the dies. This connection is effected directly and manually by means of clamps and bolts, and involves complicated and difficult operations and long periods during which the press is inoperative. These disadvantages are particularly marked in the case of large dies, like those used for the production of structural parts of motor vehicles, such as bumpers and the like.

The object of the present invention is to avoid these disadvantages by making the operations of fitting and removal of the dies quick and easy to carry out so as to reduce to a minimum the time for which the press is stopped when it is necessary to replace the dies.

SUMMARY OF THE INVENTION

According to the invention, this object is achieved by virtue of the fact that each of the plates of the press is provided with a pair of attachment structures fixed permenently along two opposite sides of the plate and define therewith two guides which are adapted slidably to receive the fixing flanges of the die, and with which are associated motor-driven clamping means which can be operated simultaneously to clamp the fixing flanges to the attachment structures.

By virtue of this characteristic, the operations of fitting and removal of the dies are considerably simplified, firstly by the fact that the guides formed by the two attachment structures enable the die to be centred easily and secondly by virtue of the elimination of lone and tedious manual clamping operations.

The motor-driven clamping means preferably include a series of horizontal rods perpendicular to the plates of the press and movable axially relative to the attachment structures between a retracted rest position and an extended clamping position, the rods carrying respective sprocket wheels meshing with rack sections which are interconnected and movable jointly along the two attachment structures by means of respective linear pressurized fluid actuators.

Each rack section is conveniently carried by a respective sliding runner which is slidable along a longitudinal guide of the corresponding attachment structure and rigidly connected to the sliding runner of the adjacent rack sector.

The two attachment structures may be fitted along the upper and lower horizontal edges of the respective plate of the press, or along the lateral edges thereof. In the first case, insertion of the die into the guides of the attachment structure is effected from the side, whilst in the second case it is carried out from above.

BRIEF DESCRIPTION OF THE DRAWINGS

The invention will now be described in detail with reference to the appended drawings, provided purely by way of non-limiting example, in which.

DETAILED DESCRIPTION OF THE PREFERRED EMBODIMENTS

Figure 1:
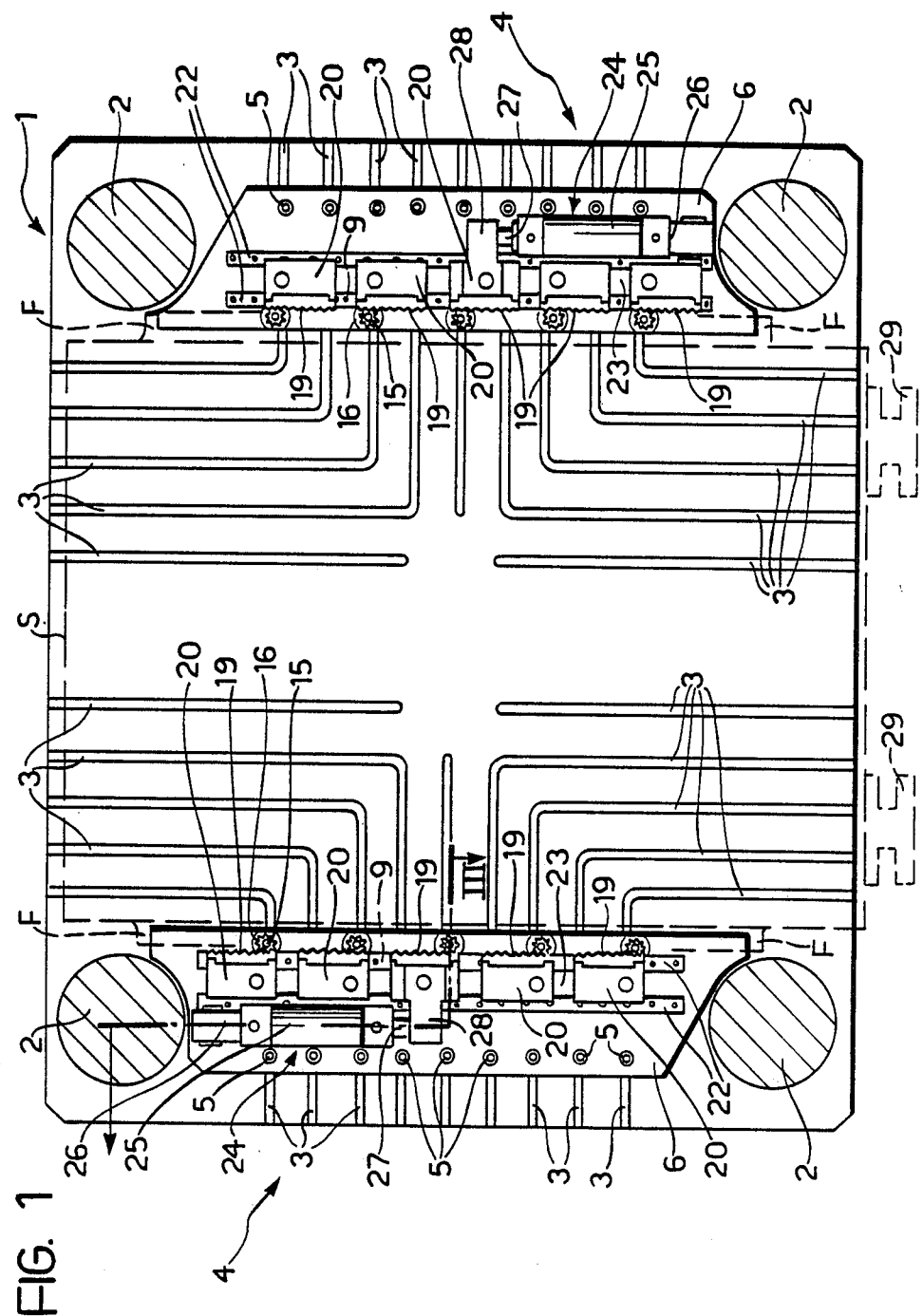
FIG. 1 is a schematic front elevational view of a support plate of a horizontal press for the injection moulding of plastics materials, equipped according to the invention.
Figure 2:
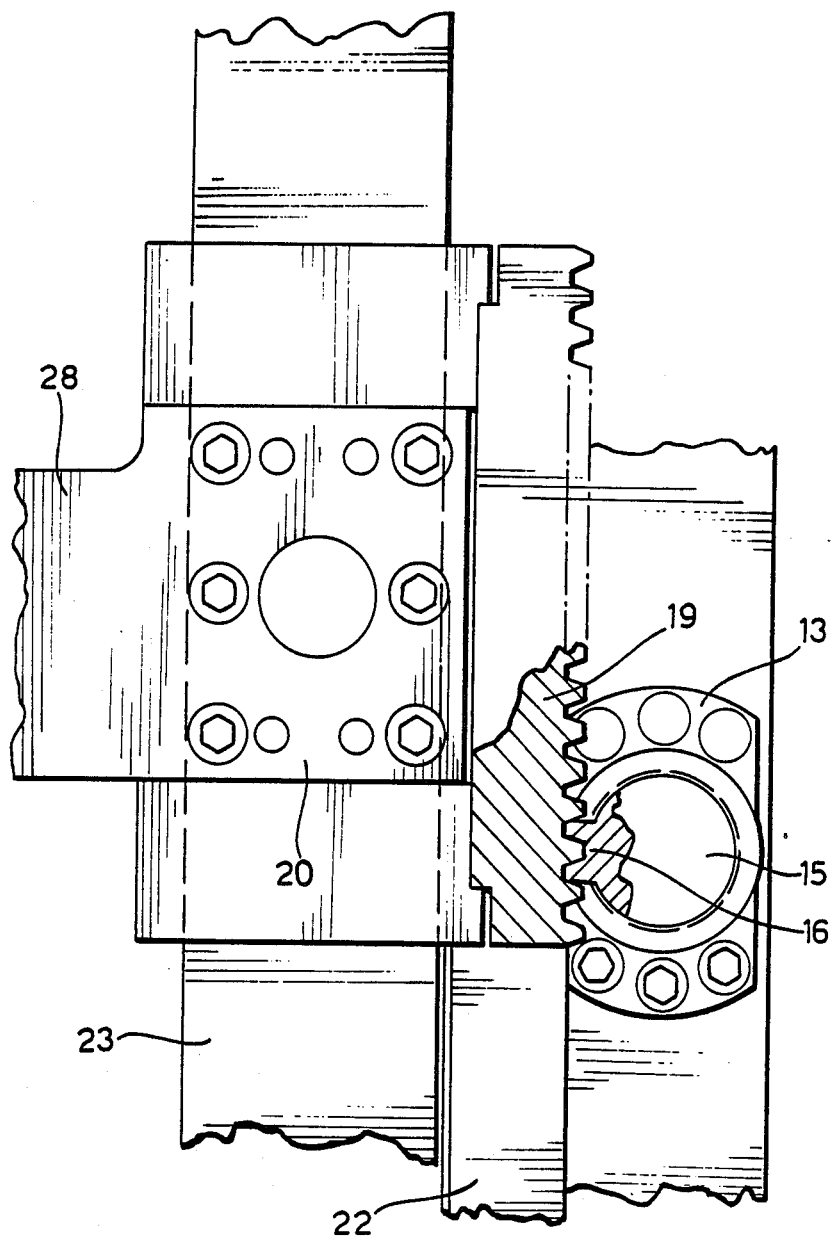
FIG. 2 is a partially sectioned view of a detail of FIG. 1 on an enlarged scale.

In the drawings, a vertical support or movable plate of a horizontal press for the injection moulding of plastics materials is indicated at 1. This press is of generally known type and, for brevity, will not therefore be described in detail. For the purposes of the present invention, it is sufficient to say that the press includes four cylindrical horizontal guide bars 2 arranged as the vertices of a quadrilateral and on which the support plate 1 (movable plate) is slidably mounted so as to be movable towards and away from a fixed counterplate (fixed plate), not illustrated, which is exactly the same as the plate 1.

The movable plate 1 is arranged, in the manner made clear below, to support a die S provided with fixing flanges F. The conformation of the movable plate 1 and its system for retaining the die S are exactly the same as those of the fixed plate, so the following description relating to the plate 1 also applies identically to the counterplate.

In conventional manner, the working face of the movable plate 1, that is, the face intended to receive the die S, has a plurality of grooves 3 perpendicular to its edges and used, according to known techniques, for the direct fixing of the flanges F of the die S by means of brackets and bolts.

According to the invention, the grooves 3 are used for the permanent fixing of a pair of attachment structures, generally indicated at 4, which serve, in the manner explained below, for the mechanised clamping of the die S. In the embodiment illustrated, the two attachment structures 4 are arranged vertically along the side edges of the plate 1 and are fixed by means of respective bolts 5 to the horizontal grooves 3. It should be noted, however, that the two attachment structures 4 could be arranged horizontally along the upper side and the lower side of the plate 1, the bolts 5 being engaged in the vertical grooves 3.

Figure 3:
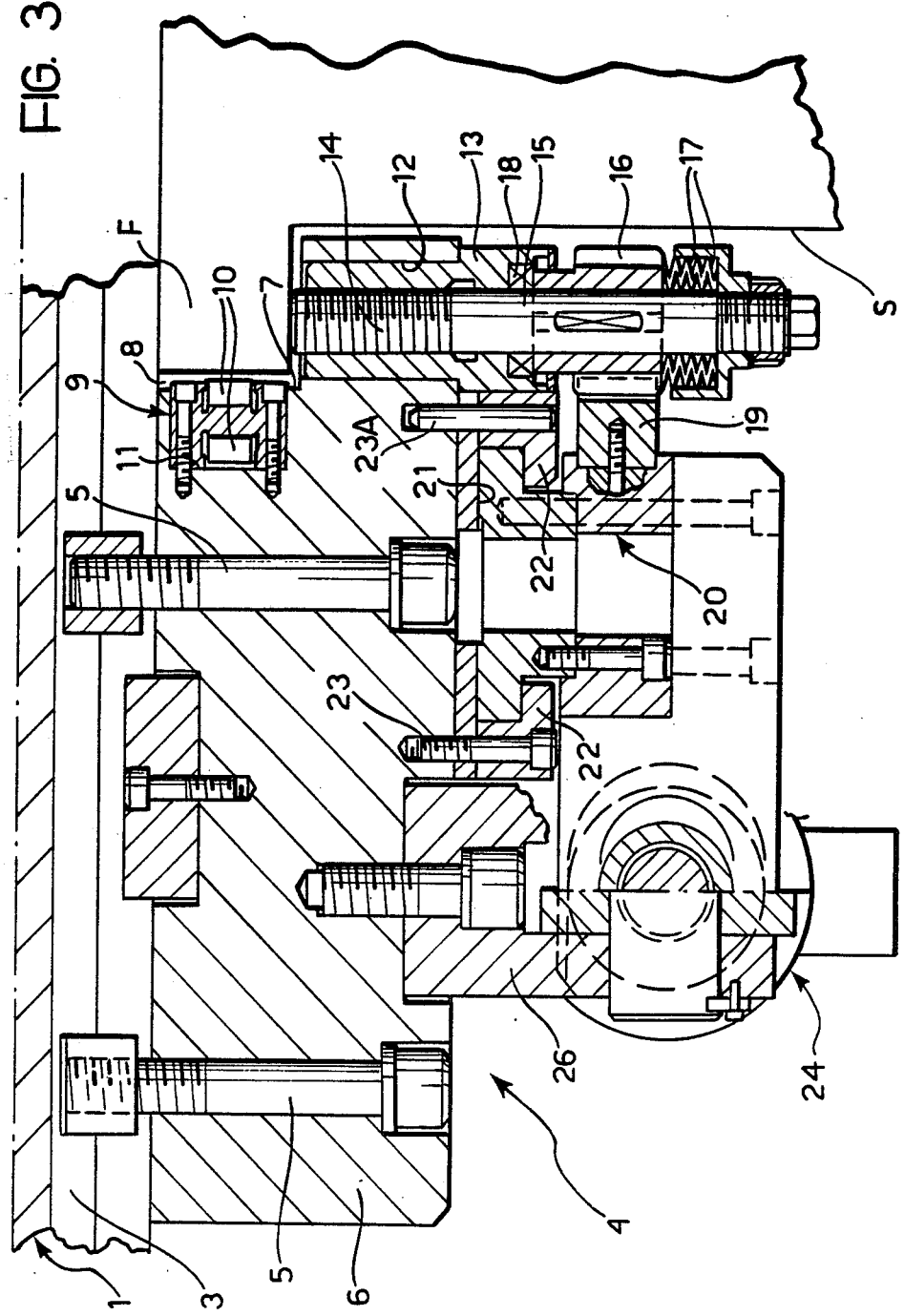
FIG. 3 is a section taken on the line III—III of FIG. 1, on an enlarged scale.

The two attachment structures 4 have an identical conformation, illustrated in greater detail in FIG. 3. Each of these structures 4 comprises a base 6 carrying the bolts 5 for attachment to the plate 1 of the press and having, in correspondence with its inner side, that is, the side facing the other attachment structure 4, an L-shaped recess, indicated 7, which defines with the working face of the plate 1 a sliding guide 8 having a shape complementary to that of the flanges F of the die S. In fact, as is clearly visible in FIG. 3, the guide 8 has a width which is slightly greater than the thickness of the flanges F.

In correspondence with the side wall of the guide 8, that is, the wall of the recess 7 which is perpendicular to the plane of the plate 1, are disposed rolling units 9 with circulating rollers 10 fixed in vertically spaced positions in correspondence with respective recesses 11 formed in the base 6.

In the recessed portion 7 defining the front face of the guide 8, that is, the face parallel to the surface of the plate 1, are formed vertically-spaced-apart holes 12 with horizontal axes in each of which is inserted and locked an internally-threaded bush 13 acting as a female thread into which is screwed a corresponding thread 14 formed at the inner end of a shaft 15 which acts as a rod. On the portion of the shaft 15 which projects outwardly of the female thread 13 is mounted a sprocket wheel 16 which is urged axially by the action of a spring assembly 17 against a thrust bearing 18 mounted in the female thread 13. The sprocket wheel 16 and the shaft 15 are fast for rotation with each other, whilst the shaft 15 is axially slidable relative to the sprocket 16.

The sprocket wheel 16 meshes with a rack section 19 carried by a sliding runner 20 which is slidable vertically within a prismatic guide 21 defined by two L-shaped profiles 22 fixed by means of screws 23 to the face of the base 6 opposite to the plate 1.

The sliding runners 20 carrying the rack section 19 associated with the sprocket wheels 16 of the various rods 15 are interconnected by means of vertical interconnecting elements 23A for simultaneous vertical movement along the sliding guide 21.

A pressurised-fluid jack 24 is provided to effect this vertical movement, and its cylinder 25 is carried by an attachment 26 fixed to the base 6 while its piston 27 is fixed to a side arm 28 fixed to one of the sliding runners 20.

It will be clear that operation of the jack 24 causes the vertical translation in one direction or in the opposite direction of the sliding runners 20 interconnected by the connecting members 23, by means of the piston 27 and the arm 28, and hence the screwing and unscrewing of the rods 15 relative to the female threads of bush 13, by means of the meshing between the rack sections 19 and the sprocket wheels 16. In other words, the operation of the jack 24 causes the simultaneous retraction or extension of the rods 15 relative to the sliding guide 8, in order to enable easy and rapid replacement of the die S in the manner explained below.

In order to mount the die, the rods 15 are disposed in the retracted position and the die S is lowered from above (normally by means of an overhead crane) so that its flanges F are introduced into the sliding guides 8 of the attachment structures 4. The die S is then lowered and positioned vertically along the guides 8 with the help of the roller units 9 which facilitate the sliding of the flanges F. When the desired position has automatically been reached, with the lower side of the die S resting on two horizontal tracks 29 provided below the plate 1 and acting as safety members against accidental dropping of the die S, the two jacks 24 associated with the two attachment structures 4 are activated so as to cause the simultaneous advance of the rods 15 and the clamping of the flanges F of the die S against the working face of the plate 1.

In order to remove the die S, the above-described operations are carried out in reverse, that is, the rods 15 are simultaneously retracted so as to release the flanges F and enable them to slide upwards along the guides 8 until the die S is completely raised.

If the two attachment structures were fitted to the plate 1 in horizontal positions instead of in vertical positions, the insertion and removal of the die S would obviously be carried out laterally in exactly the same way as that described above.

It will be clear from the foregoing that the use of the attachment structures 4 enables the operations of replacement of the dies to be made considerably easier and quicker with a drastic reduction in the period for which the press is inoperative and thus, in point of fact, with a considerable increase in its productivity.

We claim:

1. A system for rapid clamping of dies on a horizontal press for injection moulding of plastics materials, which comprises a pair of facing vertical support plates which are displaceable horizontally relative to each other and are arranged for removable fixing of respective dies provided with respective fixing flanges, wherein each of the plates is provided on a side thereof with a pair of attachment structures fixed permanently along opposed ends of said side of the respective plate and defining therewith two guides adapted slidably to receive the fixing flanges of the respective die, motor driven clamping means associated with said guides and being operable simultaneously to clamp the fixing flanges to the attachment structures, said clamping means including a series of horizontal rods extending perpendicular to the plates of the press and movable axially relative to the respective attachment structures between a retracted rest position and an extended clamping position, said retracted rest position and said extended clamping position provided by respective sprocket wheels carried by said rods intermeshing with rack sections which are movable jointly along the two respective attachment structures, and respective pressurised-fluid actuators for moving the rack sections.

2. A clamping system according to claim 1, wherein each rack section is carried by a respective sliding runner, where each rack section is rigidly connected to the sliding runner of an adjacent rack section, and the corresponding attachment structure has a longitudinal guide along which the sliding runners are slidable.

3. A clamping system according to claim 1, wherein each rod comprises a partially threaded shaft and the respective attachment structure has fixed thereto a female thread into which the shaft is screwed and which is coupled slidably for rotation with the respective sprocket wheel meshed with the rack section, the sprocket wheel being fixed axially relative to the female thread.

4. A clamping system according to claim 1, wherein roller circulating units are associated laterally with the sliding guides of the respective two attachment structures and are adapted to facilitate sliding of the flanges of the die when it is being inserted into or removed from the attachment structures.

5. A system for rapid clamping of dies on a horizontal press for injection moulding of plastics materials, which comprises a pair of facing vertical support plates which are displaceable horizontally relative to each other and are arranged for removable fixing of respective dies provided with respective fixing flanges, wherein each of the plates is provided on a side thereof with a pair of attachment structures fixed permanently along opposed ends of said side of the respective plate and defining therewith two guides adapted slidably to receive the fixing flanges of the respective die, clamping means associated with said guides and being operable simultaneously to clamp the fixing flanges to the attachment structures, said clamping means including a series of horizontal rods extending perpendicular to the plates of the press and movable axially relative to the respective attachment structures between a retracted rest position and an extended clamping position, said retracted rest position and said extended clamping position provided by respective sprocket wheels carried by said rods intermeshing with rack sections arranged to be movable jointly along the two respective attachment structures, and respective pressurised-fluid actuators for moving the rack sections.

6. A system for rapid clamping of dies on a horizontal press for injection moulding of plastics materials, which comprises a pair of facing vertical support plates which are displaceable horizontally relative to each other and are arranged for removable fixing of respective dies provided with respective fixing flanges, wherein each of the plates is provided on a side thereof with a pair of attachment structures fixed permanently along opposed ends of said side of the respective plate and defining therewith two guides adapted slidably to receive the fixing flanges of the respective die, clamping means associated with said guides and being operable simultaneously to clamp the fixing flanges to the attachment structures, said clamping means including a series of horizontal rods extending perpendicular to the plates of the press and movable axially relative to the respective attachment structures between a retracted rest position and an extended clamping position, said retracted rest position and said extended clamping position provided by means movable jointly along the two respective attachment structures, and respective pressurized-fluid actuators for moving said movable means.

* * * * *